United States Patent Office 3,084,096
Patented Apr. 2, 1963

3,084,096
INDANYL N-METHYL CARBAMATE
Joseph A. Lambrech, Charleston, W. Va., assignor to Union Carbide Corporation, a corporation of New York
No Drawing. Filed Aug. 29, 1955, Ser. No. 531,274
7 Claims. (Cl. 167—30)

This invention relates to new chemical compounds and to insecticidal compositions containing them. More particularly, the present invention relates to certain aryl esters of N-substituted carbamic acids and to insecticidal compositions containing the same.

The compounds of this invention may be represented by the general formula:

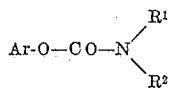

wherein Ar is a substituted or unsubstituted aryl radical comprising at least two fused rings and containing a total of from 9 to 10 carbon atoms in the aromatic nucleus, $R^1$ is a member selected from the class consisting of alkyl, substituted alkyl, cycloalkenyl, aryl, hydrogen and hydroxyl and $R^2$ is a member selected from the class consisting of hydrogen and methyl, the total number of carbon atoms in $R^1$ and $R^2$ being not greater than 7.

The compounds of my invention may be represented by one of the following formulae:

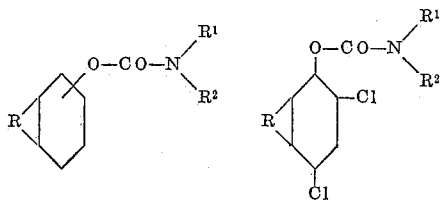

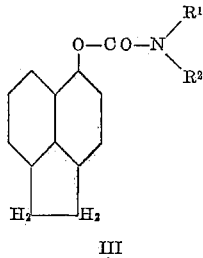

wherein R is a member selected from the class consisting of —HC=CH—CH=CH—,

—CH$_2$—CH$_2$—CH$_2$—CH$_2$—

—CH—CH$_2$—CH$_2$— and

—CH=CH—CH=C—
        |
        O—CO—N$\langle$ $R^1$ $R^2$ where R' is a member selected from the class consisting of alkyl, substituted alklyl, cycloalkenyl, aryl, hydrogen and hydroxyl and $R^2$ is a member selected from the class consisting of hydrogen and methyl, the total number of carbon atoms in $R_1$ and $R_2$ attached to any one nitrogen atom being not greater than 7.

Examples of compounds represented by Formula I are: 1-naphthyl carbamate, 1-naphthyl N-methyl carbamate, 1-naphthyl N,N-dimethyl carbamate, 1-naphthyl N-ethyl carbamate, 1-naphthyl N-ethyl N-methyl carbamate, 1-naphthyl N-n-propyl carbamate, 1-naphthyl N-n-propyl N-methyl carbamate, 1-naphthyl N-isopropyl carbamate, 1-naphthyl N-isopropyl N-methyl carbamate, 1-naphthyl N-n-butyl carbamate, 1-naphthyl N-n-butyl N-methyl carbamate, 1-naphthyl N-isobutyl carbamate, 1-naphthyl N-isobutyl N-methyl carbamate, 1-naphthyl N-pentyl carbamate, 1-naphthyl N-pentyl N-methyl carbamate, 1-naphthyl N-hexyl carbamate, 1-naphthyl N-hexyl N-methyl carbamate, 1-naphthyl N-cyclopentenyl carbamate, 1-naphthyl N-cyclopentenyl N-methyl carbamate, 1-naphthyl N-phenyl carbamate, 1-naphthyl N-phenyl N-methyl carbamate, 1-naphthyl N-2′,2′,2′-trichloro-1′-hydroxyethyl carbamate, 1-naphthyl N-2′,2′,2′-trichloro-1′-hydroxyethyl N-methyl carbamate, 1-naphthyl N-hydroxy carbamate, 1-naphthyl N-hydroxy N-methyl carbamate, 2-naphthyl carbamate, 2-naphthyl N,N-dimethyl carbamate, 2-naphthyl N-ethyl carbamate, 2-naphthyl N-ethyl N-methyl carbamate, 2-naphthyl N-n-propyl carbamate, 2-naphthyl N-n-propyl N-methyl carbamate, 2-naphthyl N-isopropyl carbamate, 2-naphthyl N-isopropyl N-methyl carbamate, 2-naphthyl N-n-butyl carbamate, 2-naphthyl N-n-butyl N-methyl carbamate, 2-naphthyl N-isobutyl carbamate, 2-naphthyl N-isobutyl N-methyl carbamate, 2-naphthyl N-pentyl carbamate, 2-naphthyl N-pentyl N-methyl carbamate, 2 - naphthyl N - hexyl carbamate, 2-naphthyl N-hexyl N-methyl carbamate, 2-naphthyl N-cyclopentenyl carbamate, 2-naphthyl N-cyclopentenyl N-methyl carbamate, 2-naphthyl N-phenyl carbamate, 2-naphthyl N-phenyl N-methyl carbamate, 2-naphthyl N-2′,2′,2′-trichloro-1′-hydroxyethyl carbamate, 2-naphthyl N-2′,2′,2′-trichloro-1′-hydroxyethyl N-methyl carbamate, 2-naphthyl N-hydroxy carbamate, 2-naphthyl N-hydroxy N-methyl carbamate, 5,6,7,8-tetrahydro-1-naphthyl carbamate, 5,6,7,8-tetrahydro - 1 - naphthyl N-methyl carbamate, 5,6,7,8-tetrahydro-1-naphthyl N,N-dimethyl carbamate, 5,6,7,8-tetrahydro-1-naphthyl N-ethyl carbamate, 5,6,7,8-tetrahydro-1-naphthyl N-ethyl N-methyl carbamate, 5,6,7,8-tetrahydro-1-naphthyl N-n-propyl carbamate, 5,6,7,8-tetrahydro-1-naphthyl N-n-propyl N-methyl carbamate, 5,6,7,8-tetrahydro - 1 - naphthyl N-isopropyl carbamate, 5,6,7,8-tetrahydro-1-naphthyl N-isopropyl N-methyl carbamate, 5,6,7,8-tetrahydro-1-naphthyl N-isopropyl carbamate, 5,6,7,8-tetrahydro-1-naphthyl N-n-butyl N-methyl carbamate, 5,6,7,8-tetrahydro-1-naphthyl N-isobutyl carbamate, 5,6,7,8-tetrahydro-1-naphthyl N-isobutyl N-methyl carbamate, 5,6,7,8-tetrahydro-1-naphthyl N-pentyl carbamate, 5,6,7,8-tetrahydro - 1 - naphthyl N-pentyl N-methyl carbamate, 5,6,7,8-tetrahydro-1-naphthyl N-hexyl carbamate, 5,6,7,8-tetrahydro - 1 - naphthyl N-hexyl N-methyl carbamate, 5,6,7,8-tetrahydro-1-naphthyl N-cyclopentenyl carbamate, 5,6,7,8-tetrahydro-1-naphthyl N-cyclopentenyl N-methyl carbamate, 5,6,7,8 - tetrahydro-1-naphthyl N-phenyl carbamate, 5,6,7,8-tetrahydro-1-naphthyl N-phenyl N-methyl carbamate, 5,6,7,8-tetrahydro-1-naphthyl N-2′,2′,2′-trichloro-1′-hydroxy-ethyl carbamate, 5,6,7,8-tetrahydro-1-naphthyl N-2′,2′,2′-trichloro - 1′-hydroxyethyl N-methyl carbamate, 5,6,7,8 - tetrahydro - 1-naphthyl N - hydroxy carbamate, 5,6,7,8 - tetrahydro - 1-naphthyl N-hydroxy N-methyl carbamate, 5,6,7,8-tetrahydro-2-naphthyl carbamate, 5,6,7,8-tetrahydro-2-naphthyl N-methyl carbamate, 5,6,7,8-tetrahydro-2-naphthyl N,N-dimethyl carbamate, 5,6,7,8-tetrahydro - 2 - naphthyl N-ethyl carbamate, 5,6,7,8-tetrahydro-2-naphthyl N-ethyl N-methyl carbamate, 5,6,7,8-tetrahydro-2-naphthyl N-n-propyl carbamate, 5,6,7,8-tetrahydro-2-naphthyl N-n-propyl N-methyl carbamate, 5,6,7,8-tetrahydro-2-naphthyl N-isopropyl carbamate, 5,6,7,8-tetrahydro - 2 - naphthyl N-isopropyl N-methyl carbamate, 5,6,7,8-tetrahydro-2 - naphthyl N-n-butyl carbamate, 5,6,7,8-tetrahydro-2-naphthyl N-n-butyl N-methyl carbamate, 5,6,7,8-tetrahydro-2-naphthyl N-isobutyl carbamate, 5,6,7,8-tetrahydro-2-naphthyl N-isobutyl N-methyl carbamate, 5,6,7,8 - tetrahydro - 2-naphthyl N-pentyl carbamate, 5,6,7,8-tetrahydro-2-naphthyl N-pentyl N-methyl carbamate, 5,6,7,8-tetrahydro-2- naphthyl N-hexyl carbamate, 5,6,7,8-tetrahydro-2-naphthyl N-hexyl N-methyl carbamate, 5,6,7,8-tetrahydro-2-naphthyl N-cyclopentenyl carbamate, 5,6,7,8-tetrahydro-2-naphthyl N-cyclopentenyl N-methyl carbamate, 5,6,7,8-tetrahydro-2-naphthyl N-phenyl carbamate, 5,6,7,8-tetrahydro-2-naphthyl N-phenyl N-methyl carbamate, 5,6,7,8-tetrahydro-2-naphthyl N-2',2',2'-trichloro-1'-hydroxyethyl carbamate, 5,6,7,8-tetrahydro - 2 - naphthyl N-2',2',2'-trichloro-1'-hydroxyethyl N-methyl carbamate, 5,6,7,8-tetrahydro-2-naphthyl N-hydroxy carbamate, 5,6,7,8-tetrahydro-2-naphthyl N-hydroxy N-methyl carbamate, 4-indanyl carbamate, 4-indanyl N-methyl carbamate, 4-indanyl N,N-dimethyl carbamate, 4-indanyl N-ethyl carbamate, 4-indanyl N-ethyl N-methyl carbamate, 4-indanyl N-n-propyl carbamate, 4-indanyl N-n-propyl N-methyl carbamate, 4-indanyl N-isopropyl carbamate, 4-indanyl N-isopropyl N-methyl carbamate, 4-indanyl N-n-butyl carbamate, 4-indanyl N-n-butyl N-methyl carbamate, 4-indanyl N-isobutyl carbamate, 4-indanyl N-isobutyl N-methyl carbamate, 4-indanyl N-pentyl carbamate, 4-indanyl N-pentyl N-methyl carbamate, 4-indanyl N-hexyl carbamate, 4-indanyl N-hexyl N-methyl carbamate, 4-indanyl N-cyclopentenyl carbamate, 4-indanyl N-cyclopentenyl N-methyl carbamate, 4-indanyl N-phenyl carbamate, 4-indanyl N-phenyl N-methyl carbamate, 4 - indanyl N-2',2',2' - trichloro-1'-hydroxyethyl carbamate, 4-indanyl N-2',2',2'-trichloro-1'-hydroxyethyl N-methyl carbamate, 4-indanyl N-hydroxy carbamate, 4-indanyl N-hydroxy N-methyl carbamate, 5-indanyl carbamate, 5-indanyl N-methyl carbamate, 5-indanyl N,N-dimethyl carbamate, 5-indanyl N-ethyl carbamate, 5-indanyl N-ethyl N-methyl carbamate, 5-indanyl N-n-propyl carbamate, 5-indanyl N-n-propyl N-methyl carbamate, 5-indanyl N-isopropyl carbamate, 5-indanyl N-isopropyl N-methyl carbamate, 5-indanyl N-n-butyl carbamate, 5 - indanyl N-n-butyl N-methyl carbamate, 5-indanyl N-isobutyl carbamate, 5-indanyl N-isobutyl N-methyl carbamate, 5-indanyl N-pentyl carbamate, 5-indanyl N-pentyl N-methyl carbamate, 5-indanyl N-hexyl carbamate, 5-indanyl N-hexyl N-methyl carbamate, 5-indanyl N-cyclopentenyl carbamate, 5-indanyl N-cyclopentenyl N-methyl carbamate, 5-indanyl N-phenyl carbamate, 5-indanyl N-phenyl N-methyl carbamate, 5-indanyl N-2',2',2'-trichloro-1'-hydroxyethyl carbamate, 5-indanyl N-2',2',2'-trichloro-1'-hydroxyethyl N-methyl carbamate, 5-indanyl N-hydroxy carbamate, 5-indanyl N-hydroxy N-methyl carbamate, naphth-1,5-yl bis (carbamate), naphth-1,5-yl bis (N-methyl carbamate), naphth-1,5-yl bis (N,N-dimethyl carbamate), naphth-1,5-yl bis (N-ethyl carbamate), naphth-1,5-yl bis (N-ethyl N-methyl carbamate), naphth-1,5-yl bis (N-n-propyl carbamate), naphth-1,5-yl bis (N-n-propyl N-methyl carbamate), naphth-1,5-yl bis (N-isopropyl carbamate), naphth-1,5-yl bis (N-isopropyl N-methyl carbamate), naphth-1,5-yl bis (N-n-butyl carbamate), naphth-1,5-yl bis (N-n-butyl N-methyl carbamate), naphth-1,5-yl bis (N-isobutyl carbamate), naphth-1,5-yl bis (N-isobutyl N-methyl carbamate), naphth-1,5-yl bis (N-pentyl carbamate), naphth-1,5-yl bis (N-pentyl N-methyl carbamate), naphth-1,5-yl bis (N-hexyl carbamate), naphth-1,5-yl bis (N-hexyl N-methyl carbamate), naphth-1,5-yl bis (N-cyclopentenyl carbamate), naphth-1,5-yl bis (N-cyclopentenyl N-methyl carbamate), naphth-1,5-yl bis (N-phenyl carbamate), naphth-1,5-yl bis (N-phenyl N-methyl carbamate), naphth-1,5-yl bis (N-2',2',2'-trichloro-1'-hydroxyethyl carbamate), naphth-1,5-yl bis (N-2',2',2'-trichloro - 1' - hydroxyethyl N-methyl carbamate), naphth-1,5-yl bis (N-hydroxy carbamate), naphth-1,5-yl bis (N-hydroxy N-methyl carbamate).

Examples of compounds represented by Formula II are:

2,4-dichloro-1-naphthyl carbamate, 2,4-dichloro-1-naphthyl N-methyl carbamate, 2,4-dichloro-1-naphthyl N,N-dimethyl carbamate, 2,4-dichloro-1-naphthyl N-ethyl carbamate, 2,4-dichloro-1-naphthyl N-ethyl N-methyl carbamate, 2,4-dichloro-1-naphthyl N-n-propyl carbamate, 2,4-dichloro-1-naphthyl N-n-propyl N-methyl carbamate, 2,4-dichloro-1-naphthyl N-isopropyl carbamate, 2,4-dichloro-1-naphthyl N-isopropyl N-methyl carbamate, 2,4-dichloro-1-naphthyl N-n-butyl carbamate, 2,4-dichloro-1-naphthyl N-n-butyl N-methyl carbamate, 2,4-dichloro-1-naphthyl N-isobutyl carbamate, 2,4-dichloro-1-naphthyl N-isobutyl N-methyl carbamate, 2,4-dichloro - 1 - naphthyl N-pentyl carbamate, 2,4-dichloro-1-naphthyl N-pentyl N - methyl carbamate, 2,4-dichloro-1-naphthyl N-hexyl carbamate, 2,4-dichloro-1-naphthyl N-hexyl N-methyl carbamate, 2,4-dichloro-1-naphthyl N-cyclopentenyl carbamate, 2,4-dichloro-1-naphthyl N-cyclopentenyl N-methyl carbamate, 2,4-dichloro - 1 - naphthyl N-phenyl carbamate, 2,4 - dichloro-1-naphthyl N-phenyl N-methyl carbamate, 2,4-dichloro-1-naphthyl N-2',2',2'-trichloro - 1' - hydroxyethyl carbamate, 2,4-dichloro-1-naphthyl N-2',2',2' - trichloro-1'-hydroxyethyl N-methyl carbamate, 2,4-dichloro-1-naphthyl N-hydroxy carbamate, 2,4-dichloro-1-naphthyl N-hydroxy N-methyl carbamate.

Examples of compounds represented by Formula III are:

5-acenaphthenyl carbamate, 5-acenaphthenyl N-methyl carbamate, 5-acenaphthenyl N,N-dimethyl carbamate, 5-acenaphthenyl N-ethyl carbamate, 5-acenaphthenyl N-ethyl N-methyl carbamate, 5-acenaphthenyl N-n-propyl carbamate, 5-acenaphthenyl N-n-propyl N-methyl carbamate, 5-acenaphthenyl N-isopropyl carbamate, 5-acenaphthenyl N-isopropyl N-methyl carbamate, 5-acenaphthenyl N-n-butyl carbamate, 5-acenaphthenyl N-n-butyl N-methyl carbamate, 5 - acenaphthenyl N - isobutyl carbamate, 5-acenaphthenyl N-isobutyl N-methyl carbamate, 5-acenaphthenyl N - pentyl carbamate, 5 - acenaphthenyl N-pentyl N-methyl carbamate, 5-acenaphthenyl N-hexyl carbamate, 5-acenaphthenyl N-hexyl N-methyl carbamate, 5-acenaphthenyl N-cyclopentenyl carbamate, 5-acenaphthenyl N-cyclopentenyl N-methyl carbamate, 5-acenaphthenyl N-phenyl carbamate, 5-acenaphthenyl N-phenyl N-methyl carbamate, 5-acenaphthenyl N-2',2',2'-trichloro-1'-hydroxyethyl carbamate, 5-acenaphthenyl N-2',2',2'-trichloro - 1' - hydroxyethyl N-methyl carbamate, 5 - acenaphthenyl N-hydroxy carbamate, 5-acenaphthenyl N-hydroxy N-methyl carbamate.

The compounds of this invention may be prepared, generally by reacting a mono- or di-hydroxy aryl compound comprising at least two fused rings and containing a total of from 9 to 10 carbon atoms in the aromatic nucleus with phosgene to form the corresponding chloroformate and reacting the chloroformate with a primary or secondary amine to form the corresponding carbamate and HCl. If desired, the sodium salt of the mono- or di-hydroxy aryl compound may be used in place of said compound, in which case NaCl instead of HCl is the reaction product. In the formation of the chloroformate, the phosgene is dissolved in toluene or benzene or other suitable organic solvent and then added to the water solution of the hydroxy compound or its sodium salt at a temperature of from about −30° C. to 20° C. The reaction is slightly exothermic so that some external cooling is usually necessary. The chloroformate separates in the organic phase which is separated from the aqueous phase carrying the hydrogen or sodium chloride. The chloroformate may then either be isolated by distillaiton or used without further purification.

The reaction involving the addition of the chloroformate to the amine is carried out in the presence of solvents for the amine such as water or dioxane. The reaction temperature is preferably in the range from 10° C. to 50° C. Below 10° C. the reaction proceeds but the rate is too slow and above 50° C. the reaction rate is so rapid that loss of low boiling amines may occur and some decomposition may take place.

The compounds contemplated herein may be prepared by the above-described general process, starting with the appropriate aromatic hydroxy compound to form the corresponding chloroformate and using an appropriate amine to react with the chloroformate. For the most part, the products of this invention are crystalline solids which are isolated by filtration or centrifugation and dried. The products are insoluble or only slightly soluble in water and benzene.

The above described reactions may be represented graphically by the following general equations:

(1) 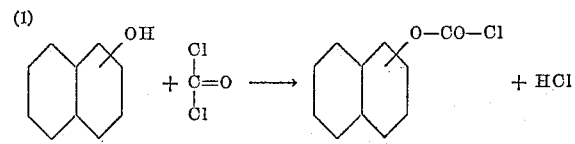

(2) 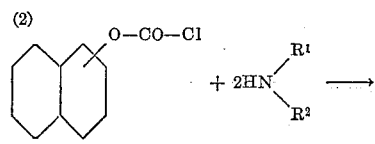

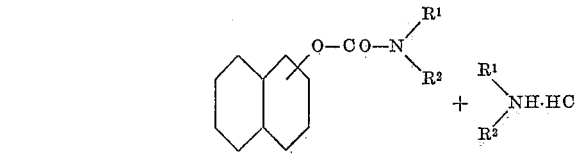

or (3) 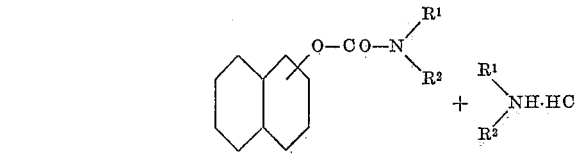

(4) 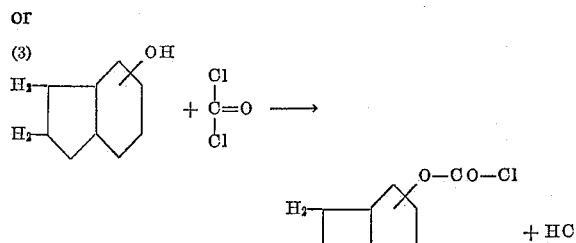

or (5) 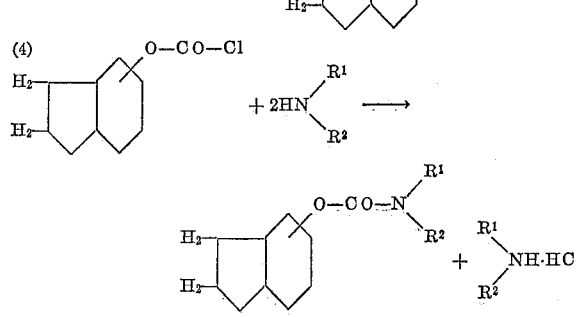

(6) 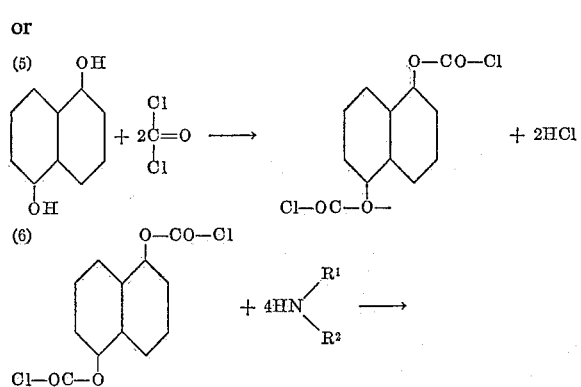

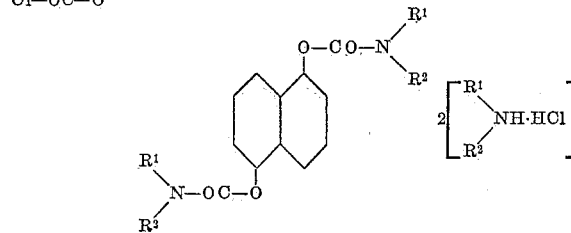

or (7) 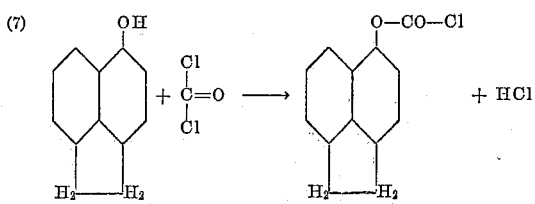

(8) 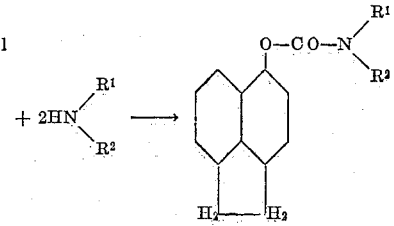

or (9) 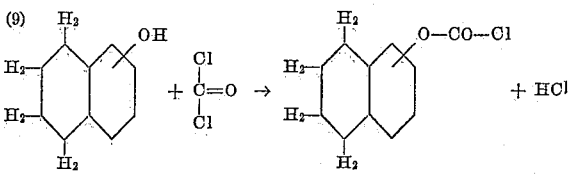

(10) 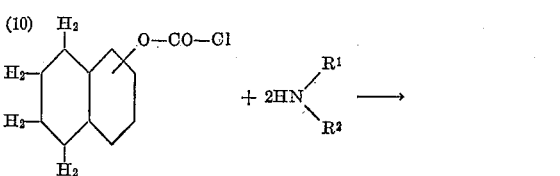

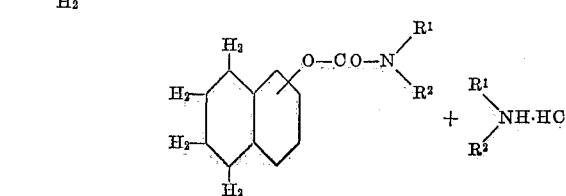

The following examples are illustrative:

EXAMPLE I

*Preparation of 4-Indanyl N-Methyl Carbamate*

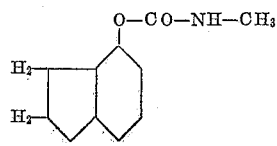

Following the general procedure, 4-indanyl N-methyl carbamate was prepared by first preparing sodium 4-indanoxide by reacting a mixture of 131 parts of 4-indanol, 350 parts of water and 44 parts of sodium hydroxide at 80° C. for 2 hours and then cooling to 20° C. A mixture of 150 parts of phosgene and 500 parts of toluene was then added dropwise. After the addition of the phosgene the reaction mixture was agitated at 20° C. for 1 hour. The organic phase of the reaction mixture was separated from the salt solution and distilled. 4-indanyl chloroformate boils at 98° C. to 100° C. at 5 mm. Hg. 4-indanyl N-methyl carbamate was prepared by slowly adding 194 parts of 4-indanyl chloroformate to a mixture of 400 parts of dioxane and 68 parts methylamine at 20° C. After the addition of the 4-indanyl chloroformate the reaction mixture was agitated at 50° C. for one hour. The mixture was filtered, and distilled. B.P. 127° C.–135° C. at 2 mm. Hg. 4-indanyl N-methyl carbamate is a white crystalline solid which melts at 72° C.

EXAMPLE II

*Preparation of 5-Indanyl N-methyl Carbamate*

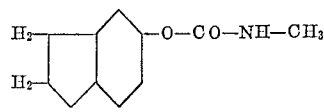

Following the general procedure, 5-indanyl chloroformate was prepared by the reaction of sodium indanoxide and phosgene. A mixture of 131 parts of 5-indanol, 350 parts water, and 44 parts sodium hydroxide was heated at 85° C. for one hour to complete the formation of sodium 5-indanoxide and cooled to 20° C. A mixture of 150 parts of phosgene and 500 parts toluene was then added dropwise. After the addition of the phosgene the reaction mixture was agitated at 25° C. for one hour. The organic phase of the reaction mixture was separated from the salt solution and distilled. 5-indanyl chloroformate boils at 88° C. at 2 mm. Hg.

5-indanyl N-methyl carbamate was prepared by slowly adding 194 parts of 5-indanyl chloroformate to a mixture of 68 parts methylamine and 400 parts dioxane at 20° C. After the addition of the 5-indanyl chloroformate the reaction mixture was agitated at 50° C. for one hour. The reaction mixture was cooled to 20° C. and the N-methylamine hydrochloride was removed by filtration. The dioxane was then removed by distillation and the 5-indanyl N-methyl carbamate distilled. 5-indanyl N-methyl carbamate boils at 135° C. to 140° C. at 2 mm. Hg and melts at 64° C.

EXAMPLE III

*Preparation of 1-Napthyl Carbamate*

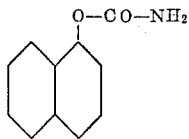

Following the general procedure, 1-naphthyl chloroformate was prepared by the reaction of sodium naphthoxide and phosgene. A mixture of 144 parts of 1-naphthol, 400 parts of water and 44 parts of sodium hydroxide was heated at 85° C. for one hour to complete the formation of sodium 1-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl carbamate was prepared by slowly adding 103 parts of 1-naphthyl chloroformate to a mixture of 125 parts of a 28 percent solution of ammonium hydroxide and 75 parts of water at 25° C. After the addition of the 1-naphthyl chloroformate the reaction mixture was agitated at 30° C. for thirty minutes. The solid which separated was filtered, washed with water, recrystallized from ethanol, and dried. 1-naphthyl carbamate is a white crystalline solid which melts at 176° C. Nitrogen analysis: theory 7.4 percent; found 6.87 percent.

EXAMPLE IV

*Preparation of 1-Napthyl N-Cyclopentenyl N-Methyl Carbamate*

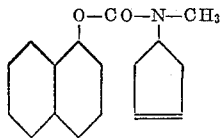

Following the general procedure, 1-naphthyl N-cyclopentenyl N-methyl carbamate was prepared by first preparing sodium 1-naphthoxide by reacting a mixture of 144 parts of 1-napthol, 400 parts of water and 44 parts of sodium hydroxide at 85° C. for one hour and then cooling to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. 1-naphthyl N-cyclopentenyl-n-methyl carbamate was prepared by slowly adding 104 parts of 1-naphthyl chloroformate to a mixture of 97 parts of N-cyclopentenyl-N-methylamine and 400 parts dioxane at 30° C. After the addition of the chloroformate the reaction mixture was agitated at 50° C. for one hour. The reaction mixture was filtered, and distilled. 1-naphthyl cyclopentenyl N-methyl carbamate is a colorless liquid which boils at 197° C. to 199° C. at 5 mm. Hg.

EXAMPLE V

*Preparation of 1-Naphthyl N-Methyl Carbamate*

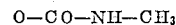
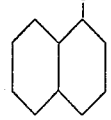

Following the general procedure, 1-naphthyl N-methyl carbamate was prepared by first preparing sodium 1-naphthoxide by reacting a mixture of 144 parts of 1-naphthol, 400 parts of water and 44 parts of sodium hydroxide at 85° C. for one hour and then cooling to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-methyl carbamate was prepared by slowly adding 103 parts of 1-naphthyl chloroformate to a mixture of 100 parts of a 39 percent water solution of methylamine and 100 parts of water at 25° C. After the addition of the 1-naphthyl chloroformate the reaction mixture was agitated at 25° C. for one hour. The solid which separated was filtered, washed with water and dried. 1-naphthyl N-methyl carbamate is a white crystalline solid which melts at 142° C. Elemental analysis: carbon found 71.2 percent; theory 71.6 percent, hydrogen found 5.6 percent; theory 5.5 percent.

EXAMPLE VI

*Preparation of 1-Naphthyl N-Hexyl Carbamate*

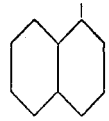

Following the general procedure, 1-naphthyl chloroformate was prepared by the reaction of sodium naphthoxide and phosgene. A mixture of 144 parts of 1-naphthol, 400 parts of water and 44 parts of sodium hydroxide was heated at 85° C. for one hour to complete the formation of sodium 1-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-hexyl carbamate was prepared by slowly adding 103 parts of 1-naphthyl chloroformate to a mixture of 101 parts N-hexylamine and 600 parts dioxane at 20° C. After the addition of the 1-naphthyl chloroformate the reaction mixture was agitated at 40° C. for thirty minutes. The mixture was cooled to 20° C. and the n-hexylamine hydrochloride was removed by filtration. The dioxane was then removed by distillation and the 1-naphthyl N-hexyl carbamate residue dissolved in ethyl ether and washed with water. Ethyl ether was then removed by distillation and 1-naphthyl N-hexyl carbamate taken as a residue product. 1-naphthyl N-hexyl carbamate is an amber colored liquid which has a specific gravity of 1.064 at 20° C./20° C. and a nitrogen analysis of 5.12 percent (theory 5.1 percent).

EXAMPLE VII

*Preparation of 1-Naphthyl N,N-Dimethyl Carbamate*

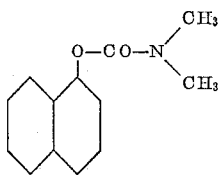

Following the general procedure 1-naphthyl N,N-dimethyl carbamate was prepared by first preparing sodium 1-naphthoxide by reacting a mixture of 144 parts of 1-naphthol, 400 parts of water and 44 parts of sodium hydroxide at 85° C. for one hour and then cooling to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg. 1-naphthyl N,N-dimethyl carbamate was prepared by slowly adding 114 parts of 1-naphthyl chloroformate to a mixture of 50 parts of a dimethylamine dissolved in 300 parts of dioxane at 15° C. After the addition of the chloroformate the reaction mixture was agitated at 50° C. for one hour. The liquid was separated from the brine solution and filtered, and distilled. 1-naphthyl N,N-dimethyl carbamate is a colorless liquid which boils at 170° C. to 172° C. at 3 mm. Hg.

EXAMPLE VIII

*Preparation of 1-Naphthyl N-Methyl N-Phenyl Carbamate*

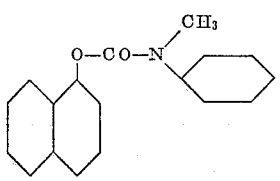

Following the general procedure, 1-naphthyl chloroformate was prepared by the reaction of sodium naphthoxide and phosgene. A mixture of 144 parts of 1-naphthol, 400 parts of water and 44 parts of sodium hydroxide was heated at 85° C. for one hour to complete the formation of sodium 1-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-methyl N-phenyl carbamate was prepared by slowly adding 103 parts of 1-naphthyl chloroformate to a mixture of 400 parts dioxane and 107 parts N-methylaniline at 25° C. After the addition of the 1-naphthyl chloroformate the reaction mixture was agitated at 50° C. for one hour. The mixture was cooled to 20° C. and the N-methylaniline hydrochloride was removed by filtration. The dioxane was then removed by distillation and the 1-naphthyl N-methyl N-phenyl carbamate distilled. 1-naphthyl N-methyl N-phenyl carbamate boils at 198° C. to 202° C. at 2 mm. Hg.

EXAMPLE IX

*Preparation of 1-Naphthyl N-Hydroxy Carbamate*

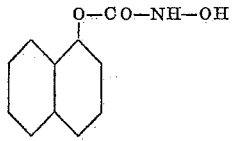

Following the general procedure, 1-naphthyl chloroformate was prepared by the reaction of sodium naphthoxide and phosgene. A mixture of 144 parts of 1-naphthol, 400 parts of water and 44 parts of sodium hydroxide was heated at 85° C. for one hour to complete the formation of sodium 1-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-hydroxy carbamate was prepared by slowly adding 103 parts of 1-naphthyl chloroformate to a mixture of 84 parts of hydroxylamine hydrochloride, 48 parts of sodium hydroxide and 350 parts water at 25° C. After the addition of the 1-naphthyl chloroformate the reaction mixture was agitated at 30° C. for one hour. The solid which separated was filtered, washed with water and dried. 1-naphthyl N-hydroxy carbamate is a white crystalline solid which melts at 120° C.

EXAMPLE X

*Preparation of 2-Naphthyl N-Methyl Carbamate*

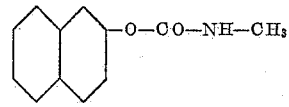

Following the general procedure, 2-naphthyl chloroformate was prepared by the reaction of sodium naphthoxide and phosgene. A mixture of 144 parts of 2 naphthol, 400 parts of water, and 44 parts of sodium hydroxide was heated at 85° C. for one hour to complete the formation of sodium 2-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 2-naphthyl chloroformate boils at 100° C. to 102° C. at 2 mm. Hg.

2-naphthyl N-methyl carbamate was prepared by slowly adding 103 parts of 2-naphthyl chloroformate to a mixture of 100 parts of a 39 percent water solution of methylamine and 100 parts of water at 25° C. After the addition of the 2-naphthyl chloroformate the reaction mixture was agitated at 25° C. for one hour. The solid which separated was filtered, washed with water and dried. 2-naphthyl N-methyl carbamate is a white crystalline solid which melts at 118° C. Nitrogen analysis: theory 6.02 percent; found 6.9 percent.

EXAMPLE XI

*Preparation of 2,4-Dichloro-1-Naphthyl N-Methyl Carbamate*

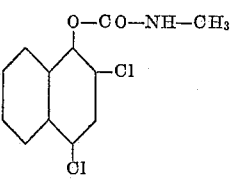

Following the general procedure, 2,4-dichloro-1-naphthyl chloroformate was prepared by the reaction of sodium 2,4-dichloronaphthoxide and phosgene. A mixture of 106 parts of 2,4-dichloro-1-naphthol, 200 parts of water and 24 parts of sodium hydroxide was heated at 85° C. for one hour to complete the formation of sodium 2,4-dichloro-1-naphthoxide and cooled to 20° C. A mixture of 98 parts phosgene and 400 parts toluene was then added dropwise. After the addition of the phosgene the reaction mixture was agitated at 25° C. for one hour. The organic phase of the reaction mixture was separated from the salt solution and distilled. 2,4-dichloro-1-naphthyl chloroformate boils at 148° C. to 150° C. at 3 mm. Hg.

2,4-dichloro-1-naphthyl N-methyl carbamate was prepared by slowly adding 66 parts of 2,4-dichloro-1-naphthyl chloroformate to a mixture of 75 parts of a 39 percent water solution of methylamine and 100 parts of water at 25° C. After the addition of the 2,4-dichloro-1-naphthyl chloroformate the reaction mixture was agitated at 25° C. for one hour. The solid which separated was filtered, washed with water, resrystallized from xylene, and dried. 2,4-dichloro-1-naphthyl N-methyl carbamate is a white crystalline solid which melts at 196° C.

EXAMPLE XII

*Preparation of 5,6,7,8-Tetrahydro-1-Naphthyl N-Methyl Carbamate*

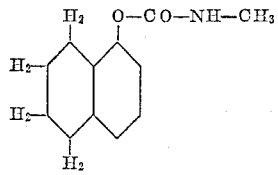

Following the general procedure, 5,6,7,8-tetrahydro-1-naphthyl chloroformate was prepared by the reaction of sodium naphthoxide and phosgene. A mixture of 148 parts 5,6,7,8 - tetrahydro - 1 - naphthol, 54 parts sodium methoxide, and 500 parts toluene was heated at its boiling point until 32 parts methanol was obtained. Mixture cooled to 20° C. and a mixture of 140 parts phosgene and 200 parts toluene then added dropwise. After the addition of the phosgene the reaction mixture was agitated for one hour at 20° C. Reaction mixture filtered and distilled. 5,6,7,8-tetrahydro-1-naphthyl chloroformate boils at 88° C. to 95° C. at 3 mm. Hg.

5,6,7,8 - tetrahydro - 1 - naphthyl N-methyl carbamate was prepared by slowly adding 107 parts of tetrahydro-1-naphthyl chloroformate to a mixture of 46 parts methylamine and 400 parts dioxane at 20° C. After the addition of the 5,6,7,8-tetrahydro-1-naphthyl chloroformate the reaction mixture was agitated at 40° C. for one hour. The mixture was cooled to 20° C. and the N-methylamine hydrochloride was removed by filtration. The dioxane was then removed by distillation and the 5,6,7,8-tetrahydro-1-naphthyl N-methyl carbamate distilled. 5,6,7,8-tetrahydro-1-naphthyl N-methyl carbamate boils at 150° C. to 155° C. at 2 mm. Hg.

EXAMPLE XIII

*Preparation of Naphth-1,5-Yl Bis (Methyl Carbamate)*

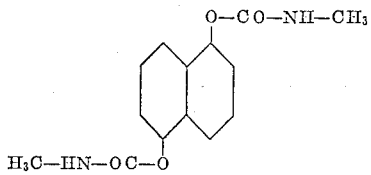

Following the general procedure, naphth-1,5-yl bis (chloroformate) was prepared by the reaction of disodium 1,5-naphthoate and phosgene. A mixture of 160 parts of naphth-1,5-diol, 400 parts of water, and 88 parts of sodium hydroxide was heated at 85° C. for one hour to complete the formation of disodium 1,5-naphthoate and cooled to 20° C. A mixture of 200 parts of phosgene and 300 parts of toluene was then added dropwise. After the addition of the phosgene the reaction mixture was agitated at 25° C. for one hour. The organic phase of the reaction mixture was separated from the salt solution and distilled.

Naphth-1,5-yl bis(methyl carbamate) was prepared by adding 142 parts of naphthyl-1,5-bis-chloroformate to a mixture of 41 parts methylamine and 500 parts dioxane at 20° C. After the addition of the naphthyl-1,5-bis-chloroformate the reaction mixture was agitated at 40° C. for thirty minutes. The mixture was cooled to 20° C. and the methylamine hydrochloride was removed by filtration. The dioxane was removed by distillation and the residue cooled. The solid residue was washed with water and dried. Naphth-1,5-yl bis (methyl carbamate) is a white crystalline solid which melts at 242° C. Nitrogen analysis: theory 10.1 percent; found 10.9 percent.

EXAMPLE XIV

*Preparation of 5-Acenaphthenyl N-Methyl Carbamate*

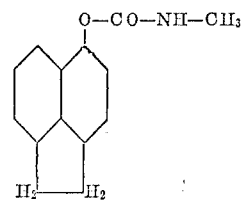

Following the general procedure 5-acenaphthenyl N-methyl carbamate was prepared by first preparing sodium 5-acenaphthenoxide by reacting a mixture of 170 parts of 5-acenaphthenol, 350 parts of water and 44 parts of sodium hydroxide at 90° C. for 2 hours and then cooling to 10° C. A mixture of 150 parts of phosgene and 500 parts of toluene was then added dropwise. After the addition of the phosgene the reaction mixture was agitated at 10° C. to 15° C. for one hour. The organic phase of the reaction mixture was separated from the salt solution and distilled. 5-acenaphthenyl chloroformate boils at 145° C. to 150° C. at 2 mm. Hg. 5-acenaphthenyl N-methyl carbamate was prepared by slowly adding 116 parts of 5-acenaphthenyl chloroformate to a mixture of 62 parts of methylamine and 400 parts of dioxane at 20° C. After the addition of the chloroformate the reaction mixture was agitated at 50° C. for one hour. The solid which separated was filtered, wahed with water and dried. 5-acenaphthenyl N-methyl carbamate is a white crystalline solid which melts at 171° C.

EXAMPLE XV

*Preparation of 1-Naphthyl N-2,2,2-Trichloro-1-Hydroxyethyl Carbamate*

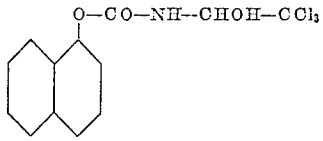

1-naphthyl N-2,2,2-trichloro-1-hydroxyethyl carbamate was prepared by slowly adding 10 parts concentrated hydrochloric acid to a mixture of 45 parts chloral, 150 parts benzene and 56 parts 1-naphthyl carbamate at 25° C. After the addition of the concentrated hydrochloric acid the reaction mixture was agitated at 70° C. for five hours. The reaction mixture was cooled to 20° C. and 500 parts water was added and allowed to stand until the reaction mixture solidified. The solid was washed with water and xylene and then dried. 1-naphthyl N-2,2,2-trichloro-1-hydroxyethyl carbamate is a white crystalline solid which melts at 144° C.

The compounds of this invention are useful as insecticides and many of them are more potent than rotenone in insecticidal activity. They are stable in the presence of light and air and in the presence of alkaline materials and are thus superior to rotenone, which is oxidized on exposure to air, the oxidation being catalyzed by light and by alkalies, for instance nicotine, lime, lime-sulfur, Bordeaux mixture and alkaline materials which are used as dust diluents.

Experiments were conducted using the following compounds. Compound Nos. 1–18, representing the present invention, were evaluated as insecticides. Compound Nos. 19–26 were tested for comparison.

No. 1—4-indanyl N-methyl carbamate:

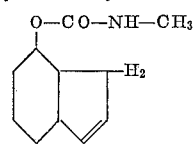

The compound has a melting point (M.P.) of 72° C. and a boiling point (B.P.) of 130° C. at 2 millimeters of pressure absolute (2 mm. Hg).

No. 2—5-indanyl N-methyl carbamate—the M.P. is 65° C.:

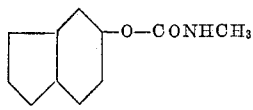

No. 3—1-naphthyl N,N-dimethyl carbamate—the B.P. is 170° C. at 3 mm. Hg:

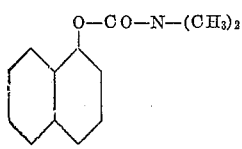

No. 4—1-naphthyl N-methyl carbamate—the M.P. is 142° C.

No. 5—1-naphthyl N-cyclopentenyl-N-methyl carbamate—the B.P. is 197° C. at 5 mm. Hg:

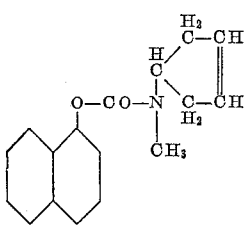

No. 6—1-naphthyl N-ethyl carbamate—the M.P. is 102° C.

No. 7—Naphth-1,5-yl bis(N-methyl carbamate)—the M.P. is 242° C.:

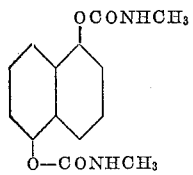

No. 8—1-naphthyl N-n-hexyl carbamate—the specific gravity is 1.064 at 20°/20° C.

No. 9—1 naphthyl carbamate—the M.P. is 176° C.:

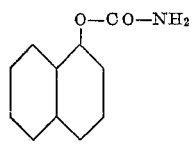

No. 10—1-naphthyl-N-hydroxy carbamate—the M.P. is 120° C.

No. 11—1-naphthyl-n-methyl-N-phenyl carbamate—the B.P. is 198° C.–202° C. at 2 mm. Hg.

No. 12—5-acenaphthenyl N-methyl carbamate—the M.P. is 171° C.:

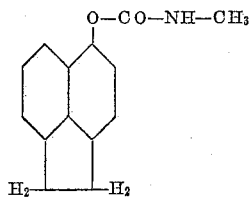

No. 13—1-naphthyl N-isopropyl carbamate—the M.P. is 112° C.

No. 14—1-naphthyl N-butyl carbamate—the M.P. is 67° C.

No. 15—2-naphthyl N-methyl carbamate—the B.P. is 118° C.

No. 16—2,4-dichloro-1-naphthyl N-methyl carbamate—the M.P. is 196° C.:

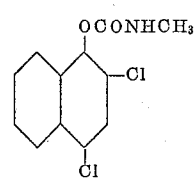

No. 17—1-naphthyl - N - 2′,2′,2′-trichloro-1′-hydroxy ethyl carbamate—the M.P. is 144° C.

No. 18—5,6,7,8-tetrahydronaphthyl N-methyl carbamate:

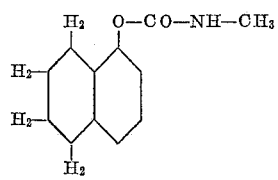

No. 19—1-naphthyl N,N-dibutyl carbamate—the B.P. is 184° C. at 1.5 mm. Hg.

No. 20—1-naphthyl N-(N′,N′,-dimethylamino)ethyl carbamate—the B.P. is 158–164° C. at 3 mm. Hg.

No. 21—1-naphthyl N-1-naphthyl carbamate—the M.P. is 260° C.

No. 22—1-naphthyl N-(alpha-methyl)benzyl carbamate—the M.P. is 125° C.

No. 23—Para-acetylphenyl N-methyl carbamate—the B.P. is 130–135° C. at 3 mm. Hg.:

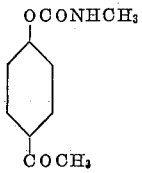

No. 24—Phenyl-N,N-dimethyl carbamate—the M.P. is 45° C.

No. 25—Para-tertiary butyl phenyl-N,N-dimethyl carbamate—the B.P. is 110° C. at 15 mm. Hg.

No. 26—2,3,5-trimethyl phenyl-N-phenyl carbamate—the M.P. is 175–176° C.

An important feature of the compounds of the present invention is that Ar in the general formula is an aryl radical containing at least two fused rings as distinguished from phenyl, resorcinyl or other monocyclic aryl radical. Another important feature of the compounds contemplated herein is that while both $R^1$ and $R^2$ may be hydrogen or an alkyl group containing 6 or less carbon atoms, the sum of the carbon atoms in $R^1$ and $R^2$ should not be greater than 7; for instance, where $R^1$ and $R^2$ are both butyl, giving a total of 8 carbon atoms in $R^1$ and $R^2$, the compound is ineffective (Compound No. 19) but where both $R^1$ and $R^2$ are hydrogen (Compound No. 9)

or $R^1$ is hydrogen and $R^2$ is methyl (Compound No. 1) or $R^1$ is methyl and $R^2$ is cyclopentenyl (Compound No. 5) or hexyl (Compound No. 8) or phenyl (Compound No. 11) the compounds are effective.

Although all of the compounds of the present invention are effective insecticides, I have found that those compounds in which the carbamate group is substituted on the alpha position of the aryl group are superior to those compounds in which the carbamate group is substituted on the beta position of the aryl group. I have further found that those compounds in which only one alkyl group is attached to the nitrogen atom in the carbamate group are superior to those compounds in which two alkyl groups are attached to the nitrogen atom in the carbamate group.

All of the twenty six materials tested are classed as water insoluble, that is the solubility is less than 1 part of the compound in 99 parts of water. Those compounds for which no melting point is listed are liquids at room temperature.

In testing the chemicals contemplated herein, as well as related chemicals, against insects, Mexican bean beetle larvae (*Epilachna varivestis* Muls.) was chosen as a representative test insect and tender green bean plants as a representative test plant. Aqueous suspensions of chemicals Nos. 1 to 26, inclusive, were prepared at the rates of 0.25 gram of the chemical dissolved in 10 milliliters (10 percent of the final volume of the suspension) of acetone in which was dissolved 0.025 g. (10 percent of the weight of the chemical) of a non-ionic wetting and emulsifying agent which solution was added to sufficient water to give 100 ml. of the suspension upon agitation. The specific emulsifier used was "Tergitol Dispersant NPX" a proprietary non-ionic alkyl phenyl polyethylene glycol ether. The suspensions thus prepared and containing 0.25 percent of the chemical were sprayed on the bean plants to run-off, the plants being on a revolving turn-table so that all parts of the plants were sprayed. After the plants were dry (about one hour after spraying) each plant was infested with a given number of fourth instar Mexican bean beetle larvae and then the leafy portion of the plan and the larvae were enclosed in a spherical wire mesh cage; and 72 hours after the infestation observations were made of the damage to foliage by the feeding larvae. The results of the tests are given in the following Table I.

TABLE I

Compound No.:

| | Mexican bean beetle, 72 hour rating |
|---|---|
| 1 | A |
| 2 | A |
| 3 | A |
| 4 | A |
| 5 | A |
| 6 | A |
| 7 | A |
| 8 | A |
| 9 | A |
| 10 | A |
| 11 | A |
| 12 | A |
| 13 | A |
| 14 | A |
| 15 | A |
| 16 | A |
| 17 | A |
| 18 | A |
| 19 | C |
| 20 | E |
| 21 | E |
| 22 | E |
| 23 | E |
| 24 | E |
| 25 | E |
| 26 | E |

The letter ratings in Table I are:

A=excellent control—little feeding
C=fair control—moderate feeding
E=poor control—severe feeding In tests made on Mexican bean beetle in a similar manner with varying concentrations of chemicals Nos. 1, 4 and 12 as well as with rotenone and the kill of beetles noted and plotted, the amount of toxicant giving a 95 percent kill (LD 95) was found to be 5.0, 1.3, 3.8 and 15.0 milligrams of toxicant in 100 milliliters of suspension, respectively.

Tests were also conducted on bean aphid (*Aphis rumicis*), using the compounds listed in Table II. For the bean aphid test nasturtium plants growing in small clay pots were infested with about 100 to 150 aphids, and then sprayed in the manner previously stated with spray compositions containing 0.25 gram of the test compound, 10 milliliters of acetone, 0.025 gram of "Tergitol Dispersant NPX" and water to 100 milliliters. After spraying, the plants were placed on their sides in a Petri dish on a piece of white paper which had previously been ruled into squares to facilitate counting. The paper was ringed with tanglefoot glue to prevent the test insects from escaping. Counts of the insects which fell to the paper and those left on the plant were made 24 hours after the spray application.

The results of the tests are given in the following Table II.

TABLE II

Compound No.:

| | Bean aphid, 24 hour rating |
|---|---|
| 1 | A |
| 2 | A |
| 3 | A |
| 4 | A |
| 5 | A |
| 6 | A |
| 18 | A |
| 19 | C |
| 20 | E |
| 21 | E |
| 22 | E |
| 23 | E |
| 24 | E |
| 25 | E |
| 26 | E |

The letter ratings in Table II are:

A=excellent control
C=fair control
E=poor control

Compound No. 1 also gave excellent control of red spider mite (*Tetranychus bimaculatus*). For this test growing bean plants were infested with about 150 to 200 mites and sprayed with an aqueous spray composition of Compound No. 1, the composition of the spray and the manner of spraying being those previously stated. The infested and sprayed plants were held under fluorescent lights until examined for insect mortality 48 hours later when it was found that excellent control of the mites was obtained.

In making the tests previously described it was noted that the sprays were not phytotoxic to the plants at the concentrations of the chemicals used. However, it was desired to test chemicals Nos. 4 and 12 in the field for phytotoxicity on the representative plants corn, bean, tomato, cabbage and broccoli. For this purpose dusts were prepared containing 2.5 and 5.0 parts of chemical No. 4 in sufficient inert particulate carrier to give 100 parts by weight. The carrier used was a finely divided pyrophyllite as representative of such inert carriers as infusorial earth, clay, talc, pumice, bentonite diatomaceous earth, cotton seed flour, walnut shell flour and the like. Aqueous suspensions of chemical Nos. 4 and 12 were also prepared from a wettable powder consisting of 25 parts by weight of compounds 4 or 12 in sufficient inert particulate carrier and wetting agent to give 100 parts by weight. The aqueous suspensions were formulated to contain 4, 2 and 1 pounds of the wettable powder per 100 gallons of water. Three applications of the dust and suspensions of compound No. 4 were made at approximately 10 day intervals. Two applications of the water suspensions of compound 12 were made at approximately 10 day intervals to corn, cabbage and broccoli only. The dusts were applied so that complete coverage of the foliage was obtained and the aqueous suspensions were sprayed on the plants to run-off. Notations as to phytotoxicity were made seven days after each application of the spray and dust. Slight phytotoxicity was evident to the bean plants treated with the four pound dosage of compound No. 4 following the third application; lower rates of application to beans showed no phytotoxicity. There was no phytotoxicity at any time to any of the cabbage, broccoli, corn or tomato plants dusted or sprayed with compound No. 4. No phytotoxicity was noted to corn, cabbage or broccoli plants sprayed with water suspensions of compound No. 12.

The toxicants or insecticides contemplated herein, i.e. the compounds of this invention, are not deleteriously affected by suitable adjuvants and additives for instance blood albumin or skimmed milk, nor are the phytotoxic properties of the toxicants affected by such agents; and, as distinguished from rotenone, the properties of the toxicants contemplated herein are not affected by alkaline spray materials such as nicotine, hydrated lime, limesulfur, Bordeaux mixture nor alkaline dust extenders with all of which materials the toxicants contemplated herein have been found to be compatible. However, the toxicants are preferably not applied to plants in solution in non-volatile solvents, for instance, oils of the type which are, of themselves, phytotoxic although such oil solutions may be used in treating paper, cardboard and the like. It is a feature of the invention that the toxicants contemplated herein are so chemically inert that they do not react with the various agents nor do they react chemically with the foliage or other parts of the plant or seed, either with or without the additive agents, in a deleterious manner.

For application to those parts of the plant which are above ground, the toxicants are preferably applied as water base sprays, the sprays containing the toxicants in finely divided condition, this condition easily being obtained by mixing a solution of the toxicant in a water soluble solvent, for instance acetone, into a larger volume of water whereupon the toxicants are thrown out of solution in the finely divided substantially colloidal condition. In the final spray, the acetone is present in only minute amount and that amount quickly volatilizes as the spray dries. Where the toxicants are used as insecticides in grain or seed treatments, they may be applied to the grain or seeds as a dust, preferably with an adhesive adjuvant, merely being tumbled with the seeds or grain. To obtain a dust, either a concentrate or a dilute composition, having the toxicant in extremely finely divided form or a solution of the toxicant in a volatile solvent, may be mixed into a particulate extender, for instance talc or an adhesive adjuvant, and then dried. The volatilization of the solvent deposits the toxicant on the extender in substantially colloidal sized particles. Regrinding may be necessary to obtain correct particle size. Aqueous spray compositions may also be prepared by grinding the toxicants in water to make a concentrated dispersion, or even with so little water as to make a paste which is then incorporated at the point of use with sufficient additional water to give a spray wherein the toxicant has the desired concentration. The concentrates, either in the form of solutions, concentrated aqueous suspensions, pastes or dusts, may contain such other components of the spray as are desirable, for instance nicotine sulfate or other insecticides or fungicides.

The concentrates from which the ultimate aqueous sprays or dusts are to be prepared preferably contain between 10 and 70 parts by weight of the toxicant with sufficient additional material either inert or active (for instance a contact insecticide or a fungicide) to make 100 parts by weight. The ultimate sprays or dusts are prepared by adding a convenient amount of additional material including inert materials and such addends, for instance nicotine sulfate or other insecticide or fungicide, as may be desired in the spray or dust schedule and as the agriculturist is in the habit of using, so that when the crop plants are thoroughly dusted or sprayed, the toxicants herein contemplated are applied at rates of from $\frac{1}{32}$ to 50 lbs. of active toxicant. Whether the toxicants are applied in dust formulations or as aqueous sprays, they are preferably applied in finely divided form. Aqueous sprays prepared by mixing a solution of the toxicants into water are, in general, preferred as the toxicants precipitate in the water in substantially colloidal form and when such a slurry or suspension is applied to the plant the foliage of the plant is thoroughly but adequately covered with the toxicant and the minute particles of the toxicant firmly lodge in the irregularities of the plant surface so that the toxicant is not dislodged by rain nor the flexing of the plant by wind. Satisfactory sprays for general use contain from about $\frac{1}{2}$ to 4 pounds of the toxicant to be applied per acre.

Emulsifying agents or suspending agents may be used if desired; in general if the spraying device has mechanism for continually agitating the spray compositions, little or no emulsifying agent need be used but where it is desired to maintain the toxicants in suspension for several hours without agitation a higher amount of emulsifying agent is desirable. The amount of emulsifying agent preferably runs from about 1 pound to 10 pounds per 100 pounds of toxicant but desirably as little emulsifying agent is used as is possible consistent with the desired emulsion characteristics of the spray, so that rain does not re-emulsify the toxicant after it is applied to the plant and wash it off of the plant.

For general use the toxicants are applied as homogeneous aqueous dispersions by the use of surface active agents. These agents cause the toxicants easily to be dispersed in water to give the aqueous sprays. The surface active agents employed may be anionic, cationic or non-ionic and include, for example, sulfonated animal, vegetable and petroleum oils, sodium lauryl sulfate glycerol monostearate, ethylene oxide condensation products with octyl phenol, lauryl pyridinium bromide and cetyldimethylbenzyl ammonium chloride. The surface active agent can comprise from 1 percent to 15 percent by weight of the concentrate.

The insecticides contemplated herein prevent attack by insects upon plants or other material to which the insecticides are applied and they have high residual toxicity. With respect to plants they have a high margin of safety in that, when used in sufficient amount to kill or repel the insects, they do not burn or injure the plant and they resist weathering which includes wash-off caused by rain, decomposition by ultra violet light, oxidation or hydrolysis in the presence of moisture or, at least, such decomposition, oxidation and hydrolysis as materially decrease the desirable insecticidal characteristics of the toxicants or impart undesirable characteristics, for instance phytotoxicity, to the toxicants. As previously stated the toxicants are so chemically inert that they are compatible with substantially any other constituents of the spray schedule. The low water solubility of the toxicants enables them to be used in the soil upon seeds or the roots of plants without injuring either the seeds, roots or plants by imbibition or root-uptake and they have such low mammalian toxicity that when applied to either the foilage of a plant or the parts of a plant which are below the surface of the soil, for instance tubers and the like, either humans or animals consuming the plants are not injured although, with respect to insects, they kill where the insects imbibe them either through food or, as in the case of the mosquito larvae, through imbibition from the environment.

Apart from the distinctive insecticidal properties of the materials herein disclosed, adapting them for agricultural use, the materials generally may be used as modifiers for resin manufacture and they may find applications in the pharmaceutical arts either as drugs, intermediates or as chemotherapeutants.

Certain subject matter disclosed but not claimed herein is claimed in copending application Serial No. 205,464, a continuation-in-part of the present application, in copending application Serial Nos. 205,466 and 205,467, both divisions of the present application, all filed June 26, 1962, and in United States Patents 2,903,478 and 3,009,855, which issued on copending application Serial No. 753,644, filed August 7, 1958.

What is claimed is:

1. A carbamate ester selected from the group consisting of 4-indanyl N-methylcarbamate and 5-indanyl N-methylcarbamate.
2. The compound 4-indanyl N-methylcarbamate.
3. The compound 5-indanyl N-methylcarbamate.
4. An insecticide composition comprising a toxic amount of a compound selected from the group consisting of 4-indanyl N-methylcarbamate and 5-indanyl N-methylcarbamate.
5. An insecticide composition comprising a toxic amount of 4-indanyl N-methylcarbamate and a carrier therefor.
6. An insecticide composition comprising a toxic amount of 5-indanyl N-methylcarbamate and a carrier therefor.
7. An insecticide composition comprising from about 0.05 to 2 percent by weight of a compound selected from the group consisting of 4-indanyl N-methylcarbamate and 5-indanyl N-methylcarbamate.

References Cited in the file of this patent

UNITED STATES PATENTS

| | | |
|---|---|---|
| 2,493,710 | Aeschlimann et al. | Jan. 3, 1950 |
| 2,592,890 | Gysin | Apr. 15, 1952 |
| 2,645,592 | Campbell | July 14, 1953 |
| 2,645,593 | Erskine | July 14, 1953 |
| 2,675,403 | Cupery | Apr. 13, 1954 |
| 2,677,698 | Deutschman et al. | May 4, 1954 |
| 2,683,735 | Cusic | July 13, 1954 |

OTHER REFERENCES

Beilstein, 6, 313 (1931).

Immelman: J. South African Chem. Inst., vol. II, No. 3, pp. 131–134.